(12) United States Patent
Mittal et al.

(10) Patent No.: US 12,086,041 B2
(45) Date of Patent: Sep. 10, 2024

(54) EARLY DATABASE TRANSACTION VISIBILITY

(71) Applicant: Salesforce, Inc., San Francisco, CA (US)

(72) Inventors: Kaushal Mittal, Mountain House, CA (US); James E. Mace, San Francisco, CA (US); Jun Chen, Cupertino, CA (US); Shao-Yuan Ho, San Jose, CA (US)

(73) Assignee: Salesforce, Inc., Cupertino, CA (US)

( * ) Notice: Subject to any disclaimer, the term of this patent is extended or adjusted under 35 U.S.C. 154(b) by 0 days.

(21) Appl. No.: 18/045,260

(22) Filed: Oct. 10, 2022

(65) Prior Publication Data

US 2024/0118982 A1    Apr. 11, 2024

(51) Int. Cl.
G06F 16/24       (2019.01)
G06F 11/20       (2006.01)
G06F 16/2455     (2019.01)

(52) U.S. Cl.
CPC ...... *G06F 11/2092* (2013.01); *G06F 16/2455* (2019.01); *G06F 2201/85* (2013.01)

(58) Field of Classification Search
CPC ............. G06F 11/2092; G06F 16/2455; G06F 2201/85
See application file for complete search history.

(56) References Cited

U.S. PATENT DOCUMENTS

| | | | |
|---|---|---|---|
| 7,725,470 B2 | 5/2010 | Richards et al. | |
| 7,733,910 B2 | 6/2010 | Mace et al. | |
| 9,015,197 B2 | 4/2015 | Richards et al. | |
| 9,208,031 B2 | 12/2015 | Mace et al. | |
| 9,575,849 B2 | 2/2017 | Mittal et al. | |
| 10,061,792 B2 | 8/2018 | Agarwal et al. | |
| 2008/0033910 A1 | 2/2008 | Richards et al. | |

(Continued)

FOREIGN PATENT DOCUMENTS

| | | |
|---|---|---|
| EP | 3535669 A1 | 9/2019 |
| WO | 2008021748 A2 | 2/2008 |
| WO | 2011082123 A1 | 7/2011 |

*Primary Examiner* — Apu M Mofiz
*Assistant Examiner* — Cindy Nguyen
(74) *Attorney, Agent, or Firm* — Kowert, Hood, Munyon, Rankin & Goetzel, P.C.; Catherine L. Gerhardt; Dean M. Munyon

(57) ABSTRACT

The disclosed techniques reduce a responsiveness time for a secondary node state of a database in switching from a second computing node to replace a first computing node acting in a primary node state, with both computing nodes performing the same database queries. The second node receives information regarding queries performed by the first node while in the primary state. In some embodiments, the second node retrieves, from a transaction log, log records detailing operations performed for database transactions. In some embodiments, the second node inserts, based on the log records, data records of the transactions into an in-memory cache of the second node that stores chains of database records from different transactions. Upon receiving sufficient information to switch to the primary state, the second node changes a mode of operation during failover making a committed transaction available for reads by subsequent database queries prior to record reordering.

20 Claims, 7 Drawing Sheets

(56) References Cited

U.S. PATENT DOCUMENTS

| | | |
|---|---|---|
| 2008/0033925 A1 | 2/2008 | Richards et al. |
| 2008/0033958 A1 | 2/2008 | Richards et al. |
| 2008/0033964 A1 | 2/2008 | Richards et al. |
| 2009/0060673 A1 | 3/2009 | Mace et al. |
| 2013/0332938 A1 | 12/2013 | Deschler et al. |
| 2015/0261821 A1 | 9/2015 | Mittal et al. |
| 2015/0261860 A1 | 9/2015 | Mittal et al. |
| 2015/0261862 A1 | 9/2015 | Mittal et al. |
| 2016/0085772 A1* | 3/2016 | Vermeulen .............. G06F 16/21 707/615 |
| 2018/0218022 A1 | 8/2018 | Mace et al. |
| 2018/0218023 A1 | 8/2018 | Fanghaenel et al. |
| 2020/0089789 A1 | 3/2020 | Mace et al. |
| 2020/0320083 A1 | 10/2020 | Helland et al. |
| 2022/0067004 A1 | 3/2022 | Agrawal et al. |
| 2022/0129433 A1 | 4/2022 | Agrawal et al. |
| 2022/0138175 A1 | 5/2022 | Mahendra et al. |
| 2023/0034426 A1* | 2/2023 | Kati ................. G06F 16/24573 |

\* cited by examiner

500

Retrieve, from a transaction log, log records detailing operations performed for a plurality of database transactions.
510

Insert, based on the log records, data records of the plurality of database transactions into an in-memory cache of the server computer system.
520

Increase, prior to reordering data records inserted in the in-memory cache according to transaction commit numbers (XCNs) of the plurality of database transactions, a visible XCN, where data records corresponding to transactions with XCNs before the visible XCN are accessible via query, and where at least two data records for a particular key with XCNs before the visible XCN are accessible out of a temporal order defined by XCNs of respective transactions corresponding to the at least two data records.
530

*FIG. 5*

*Retrieve, from a transaction log, log records detailing operations performed for a plurality of database transactions.*
*610*

*Insert, based on the log records, data records of the plurality of database transactions into an in-memory cache of the second computing node that stores chains of data records from different transactions.*
*620*

*Upon receiving sufficient information to switch to the primary node state, changing a mode of operation at least during failover to permit a committed transaction to be available for reads by a subsequent database query prior to record chain reordering.*
*630*

FIG. 6

EARLY DATABASE TRANSACTION VISIBILITY

BACKGROUND

Technical Field

This disclosure relates to data storage, in particular to an in-memory key-value storage using a chain of records.

Description of the Related Art

Computer systems may include multiple computers, workstations, servers, and storage systems, each performing different tasks. For example, in some computer systems, a particular computer may be executing software for managing e-mail messages, while other workstations, in the computer systems, may be used for word processing, web browsing, database storage, and the like.

Databases are a common method for organizing stored data in computer systems. Some databases can be queried with various keys, values of the keys, etc. in order to access particular data in the database that is associated with the key. During operation of a computer system, multiple requestors generate requests to access a database. Such requests may include a request for retrieval of one or more particular records, the storage of a new record, or the removal of a previously stored record from the database.

A computer executing a software program to manage the database may schedule the various requests for access to the database according to one of various algorithms. During the execution of a particular request, the computer may traverse the database to retrieve or delete a desired record, or determine an appropriate location in which to add a new record.

BRIEF DESCRIPTION OF THE DRAWINGS

FIG. 5 is a flow diagram depicting an example method for increasing the visibility of records via advancing a visible transaction commit number (XCN) within an in-memory cache prior to reordering data records stored in the cache, according to some embodiments.

FIG. 6 is reducing a responsiveness time for a second computing node state of a database in switching from a secondary node to replace a first computing node of the database that has been acting in a primary node state of the database, with the second computing node performing the same database queries to execute the same transactions by the database while in a secondary node state as those database transactions being processed by the first computing node in the primary state, the second computing node being operatively coupled to receive information regarding queries to be performed on the database by the first computing node while in the primary node state, according to some embodiments.

DETAILED DESCRIPTION OF EMBODIMENTS

Figure 1:
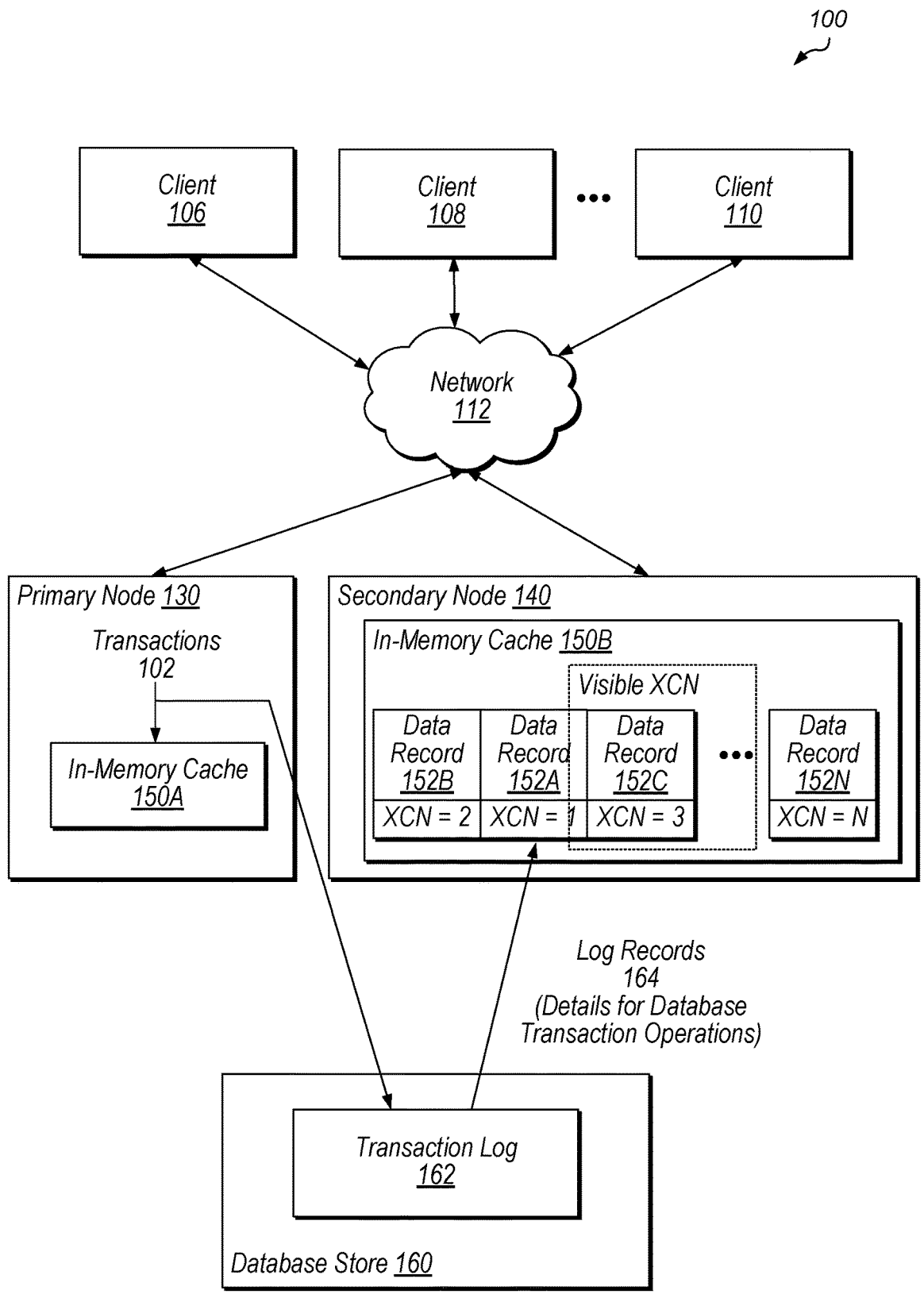
FIG. 1 is a block diagram illustrating an example database and various database clients, according to some embodiments.

Databases may use different data structures for storing and accessing data. In some cases, one or more data values may be associated with a particular key prior to storage. Once stored, the one or more data values may be retrieved using the particular key. To facilitate access to information stored in this fashion, the stored data values may be sorted by the values of the various keys (commonly referred to as "key-sorted order"). As used and described herein, a key is a portion of a key-value pair used for identification purposes. In various situations, data values may be stored in a database that includes multiple different nodes to provide redundancy, particularly in situations in which a primary node fails and needs to be replaced with a backup node.

In various disclosed embodiments, database records are read from and written to a primary database node and a secondary database node. For example, the primary node may process a transaction that involves a set of database operations which include an update operation to update the value of a particular underlying database construct (e.g., a database row). Since records are immutable once written, the primary node writes a new data records that supersedes the old data record for the same database row (these data records may be referred to as "record versions" since there can be multiple data records that are each a different version of the same database row). The primary node also writes a log record to shared storage, that indicates that it performed the update operation specified in the database transaction. But, the data record remains in the in-memory cache (e.g., Memstore™) of the primary node until it is flushed at a later time after it has been committed. The in-memory cache of the primary node acts as a temporary storage area where new operations are created and then pushed to a more permanent storage (i.e., the shared database store). The secondary node follows the transaction log and eventually sees the log record and replays the effect of the particular update operation and, thus, writes the same data record to its own in-memory cache. Once the primary node commits the transaction, it writes a commit log record that indicates that the transaction is committed. The data record generated based on performance of the transaction is stamped with an XCN and then remains in the primary node's in-memory cache for some time (e.g., the primary node waits until the cache is almost full before flushing a set of data records to a log structured merge (LSM) tree at the shared storage). The secondary node eventually sees the commit log record and commits the data record in its own in-memory cache, but instead of the data record being flushed to the LSM, it is discarded because the primary node already flushed the data record to the LSM. The secondary node may read from the LSM tree if it needs a particular data record that it does not already have stored locally (e.g., performing a query at an earlier snapshot XCN, which may include reading an old record corresponding to the earlier snapshot XCN from the LSM).

When a record is written to the primary node, the primary node writes the record into its own in-memory cache and then writes a log record to a shared storage (a redo log). The redo log records indicate details of actions performed on the primary database node. The database server writes log extents (a set of log records) from the primary database node to a database store (a storage service) that defines the redo log. In various embodiments, the redo log is used as a mechanism for tracking the actions of the primary node. An extent may also be referred to as a file. The database server writes log records from the log extents to data extents that make up the LSM tree. A secondary node reads the log records (entries from the redo log) and replays their actions on its own in-memory cache. In this way, the secondary node is able to recreate the state of the in-memory cache of the primary node. This allows the secondary node to service certain read transactions, which may offload work from the primary node.

In some situations, a primary node of a database fails and requires replacing. As such, a database server managing the database will execute a recovery process to promote a secondary node to a primary node to replace the failed primary node. Generally, a database performs a database recovery process including performing log recovery by reading from a transaction log and replaying log records to insert data records into a secondary database node. The redo of a transaction log may also be referred to as a recovery of a transaction log in many situations. Data records stored in the in-memory cache of either the primary or secondary database nodes are not persistent, but the shared storage is persistent. Thus, if there were only a primary database node and this node crashed, then all the records in the in-memory cache of the primary node would be lost and the database server would need to replay a portion of the transaction log. By implementing a secondary node that follows the transaction log and replays log records, the database server may easily switch from the primary to the secondary node (making this node the primary node) and then resume normal database operation more quickly once the secondary node has reached the last log record written by the primary node before it crashed.

In prior database recovery processes, in order to improve the efficiency of the recovery process, data records are allowed to be inserted in random order but remain uncommitted (e.g., are not visible to queries) until a chain of records that includes data records from various different transactions is reordered (the data records are placed in the proper time order according to their transaction commit numbers (XCNs). For example, during database recovery, multiple redo applier processes are executed to read transactions from the recovery log into the in-memory cache of a secondary database node in the same order that they were inserted before recovery. However, because the multiple redo appliers are allowed to execute in parallel (to speed up the recovery process), the records being inserted into the secondary node are being inserted out of temporal order. When a database transaction is then committed, the records in the in-memory cache require reordering. In various situations, reordering of records in multiple record chains within the secondary node is time consuming and resource intensive, particularly for large database transactions including multiple database commands. The large amount of resource consumption may cause a stall in visibility of data stored in the secondary database node.

In order to improve efficiency during database recovery, the disclosed database management system allows transaction commits to become available as query snapshots before all post-commit work for the transaction (e.g., record chain reordering) is complete. For example, during recovery of transactions in the database (i.e., when the primary database node has failed and a secondary node is being promoted by reading a redo log of transactions into the in-memory cache of the standby node), written transactions are allowed to show as "committed" (i.e., available for reads) before the records within these transactions have been reordered (before the records are placed back into temporal order using, e.g., an insertion sort). For example, database records in a transaction are made available after they are committed, but prior to these records being reordered.

Figure 2:
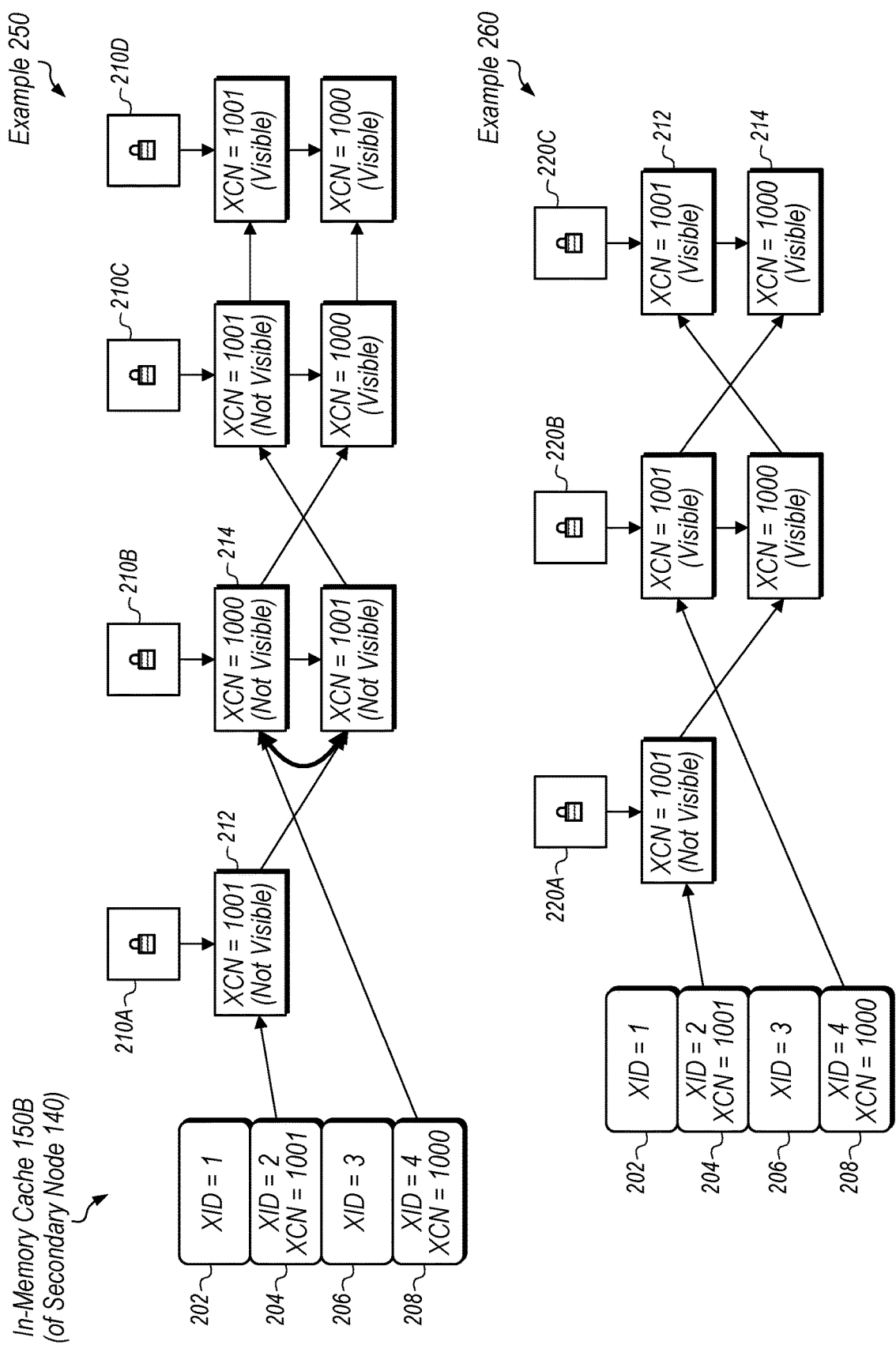
FIG. 2 is a block diagram depicting example record chains with records that are visible and out of order, according to some embodiments.

As one specific example, during database recovery, redo appliers read log records from a transaction log and enqueue them into redo queues. Various redo appliers read from the redo queues and perform the actions indicated in the log records in parallel. For example, multiple redo appliers insert transactions T1 through T10 into Memstore, but T10 is smaller than T1 (has less records). So, during recovery, T10 will likely be finished being written to Memstore before T1. At commit time, T10 is not allowed to be committed until T1 is finished being written, which causes a delay (because the records within these transactions need to be maintained in temporal order). In this example, T1 still commits prior to T10, but the commitment process for T1 is much shorter in disclosed techniques because the reordering of records from T1 is no longer required during the commitment process. As a result, a record of T10 may be inserted within a bucket in Memstore before a record of T1. When these records are queried, results of the query are slow while they are not yet sorted in temporal order and, therefore, take longer to query than reordered records. FIG. 2, discussed in detail below, illustrates an example of granting early visibility of records from different transactions stored in the in-memory cache of a secondary node being promoted.

In various embodiments, having decreased efficiency at the time records are scanned/read from the database allows for faster system recovery as a standby node becomes the primary node. For example, decreasing a time to visibility (e.g., for applications and end users) of committed records stored at a secondary node may advantageously improve database availability. In particular, in disclosed techniques, after being committed at the standby node as part of replaying log records, committed records are made visible to queries without being reordered within their record chains—i.e., records of a transaction do not have to be reordered during the commit phase of their transaction. As a result of committing a transaction without reordering record chains touched by that transaction, the standby node can proceed to commit subsequent transactions and, thus, they do not incur the time delay associated with reordering record chains touched by the transaction. Thus, the disclosed database recovery process may improve the speed at which records that were committed prior to the original primary database failure can be recovered (the speed at which a standby node is promoted to a primary node). This increase in recovery speed is due to allowing transactions to commit before records within the record chain(s) touched by those transactions have been reordered. In some situations, the disclosed database recovery techniques that allow for early access to committed records in unordered record chains may advantageously reduce the latency of newly committed data being visible to read-only queries running on secondary database nodes. For example, the presence of large transactions that require substantial post-commit processing, including record chain reordering, may cause this latency (e.g., for up to several minutes), which may occur repeatedly during operation of secondary nodes. In some situations, this may lead to apparent staleness of queries running against secondary nodes. Similarly, the disclosed techniques may advantageously reduce delays in promotion of secondary database nodes, which is often a time-critical operation.

An in-memory store may include a hash table having hash buckets which executes transactional updates concurrently for a database and stores database records for these transactional updates as key-value pairs within skip lists within hash buckets based on the hash value of their respective keys. Memstore is one example of an in-memory cache that may be utilized by database nodes to manage database transactions across nodes of the database. Hash buckets may be accessed based on keys of data records. For example, a key portion of a data record may be used to access a hash bucket. In disclosed techniques, the key portion of a key is hashed and then the record corresponding to this hashed value is placed in a hash bucket whose value corresponds to the hash value of the key portion. In disclosed techniques, data records may be stored within hash buckets in key-sorted order. A hash bucket may be included with other hash buckets in a hash table. A hash bucket (or simply a "bucket") is typically a collection of data items stored in memory that are associated with a common hash value. In various embodiments, a particular hash bucket may include an identifier (referred to herein as a "bucket identifier") that may be used to identify one hash bucket from another. A bucket identifier, as used and described herein, includes any suitable information to data used to identify the associated bucket. It is noted that in some cases, different keys may generate a common hash value, in which case, a bucket may be associated with more than one key.

A hash bucket may be associated with multiple data records depending on a value of respective keys associated with the data records. Depending on a type of hash algorithm employed, multiple keys may be associated with a given hash bucket, and pointers for the data records associated with the multiple keys may be included in the hash bucket. During traversal of a skip list, selection of a particular pointer from the multiple pointers included in a given hash bucket may depend on the key values associated with the data records whose pointers are stored in the hash bucket.

To organize stored data values in key-sorted order, a type of data structure referred to as a "skip list" may be employed. As used and described herein, a skip list refers to a data structure that includes a linked hierarchy of sequences of data records, with each successive sequence skipping over fewer elements than the previous sequence. Such structures may be implemented using records including stacks of pointers to successor records that make use of the property that, on average, the pointers on a N+1th level of the stacks will skip over twice as many records as pointers on the Nth level of the stacks. In some skip lists, the links between records may be implemented using native machine pointers. In some situations, a skip list includes a stack of record chains.

In various embodiments, record chains arrange data records within a sorted array within Memstore based on the transaction identifiers (XIDs) and XCNs of these records. For example, a record chain of data records connected to a hash bucket is a different data structure than the skip list attached to the data records. As used herein, the term "transaction commit number (XCN)" refers to a timestamp for a transaction indicating a time at which this transaction was committed in the database. A visible XCN is a commit number indicating all records before or at the visible XCN within a given hash bucket can be accessed by a query, but that records with XCNs occurring after the visible XCN are not yet accessible via query.

Example Database Management System

Turning now to FIG. 1, a block diagram of an example database and various database clients is shown. Within a system 100, a network 112 may represent the Internet, an intranet, or any other suitable type of computer network. The network 112 may couple one or more clients 106, 108, and 110 to a primary node 130 and a secondary node 140. System 100 is a database system that includes a primary database node 130 one or more secondary nodes, such as secondary node 140, and database server 160 (also referred to as a "database system" or "database computer system" or "database store"), which in turn includes a transaction log 162 and a log structure merge (LSM) tree. In various embodiments, clients may be requestors to the database system 100, which includes connecting to the primary or secondary nodes to perform various database operations. Client connections with the primary node allows for read or write operations, while client connections to the secondary node(s) allows for read operations. As discussed in further detail below, the primary node 130 and secondary node 140 include respective in-memory caches 150A and 150B.

In various embodiments, clients can perform read and write requests to primary node 130 via network 112, but can only perform read requests to secondary node 140. The primary node 130 uses information in in-memory cache 150A to determine if transactions (generated based on client read or write requests) conflict with one another, while primary node 130 keeps producing a transaction log into database store 160 for write operations. Secondary node 140 keeps consuming the transaction log to keep up with the primary node 130. Therefore, the secondary node 140 is able to handle read requests to give clients a consistent version of data s primary node 130.

In some embodiments, the database store 160 may be embodied in one or more physical or virtualized computer system(s) such as virtual machines controlling a storage cluster. Various types of data may be stored on database store 160, using a particular one of various data structures. For example, as described below in more detail, data may be stored on database store 160, primary node 130, or secondary node 140 using a record chain or any other suitable data structure. The database store 160, primary node 130, and secondary node 140 may be, in some situations, a cloud-based system providing software operation for users on clients 106, 108, or 110. For example, the database store 160 may be part of a software as a service (SaaS) model.

Database store 160 is coupled to primary node 130 and secondary node 140, which may include any suitable type of long-term persistent data storage system. The database nodes may comprise one or more physical or virtual servers. During operation, database store 160 may temporarily store pending and recently committed database transactions in transaction log 162. Clients 106, 108, and 110 may each include one or more computer systems, executing one or more software programs or applications themselves or interfacing with one or more application servers (not shown). Each of clients 106, 108, and 110 may be a database requestor, and may be configured to issue database queries to the primary node 130 and secondary node 140. Multiple queries and other database accesses from a client 106, 108, or 110 may form a transaction. The components of the transaction either complete successfully as a unit on consistent data from underlying database entries, or are rolled back and retried if the data changes due to interference from a different transaction. Generally, when two transactions conflict, primary node 130 may select a transaction to roll back and may permit the other transaction to commit, finalizing its changes to the database. Rolling back a transaction may refer to removing any changes the transaction attempted to make to the database. The transaction may be reattempted from the start, or abandoned, at the discretion of the database requestor. It is noted that the system depicted in FIG. 1 is merely an example. In other embodiments, different numbers of clients and different numbers of databases may be employed.

To facilitate the addition, removal, or relocation of data included in the in-memory cache storing pending database transactions, a record chain may be employed to link the various data records together, preserving an order of keys associated with the values stored in the data records. In various embodiments, data stored in a hash bucket of the in-memory cache that is associated with a particular key may correspond to data for a particular row included in a database. Such data is commonly referred to as "row data." An embodiment of record chains is depicted in FIG. 2. Database store 160 (within transaction log 162), primary node 130 (in, for example in-memory cache 150A), and secondary node 140 may implement record chains, such as the record chain shown in in-memory cache 150B, to preserve an order of keys associated with values stored in data records. As shown in the illustrated embodiment, primary node 130 may execute operations specified in database transactions 102 to alter data stored in primary node 130 and may store a history of these operations in in-memory cache 150A as well as transaction log 162.

System 100, in the illustrated embodiment, retrieves log records 164 from transaction log 162 that indicate details for operations performed for a plurality of database transactions at primary node 130. Secondary node 140 performs the operations indicated in log records 164 (e.g., performs the operations on its own data so that the data stored in the secondary node 140 matches the data stored in primary node 130) and then stores artifacts of these operations as e.g., data records 152A-152N within one or more record chains within in-memory cache 150B. Note that in-memory cache 150B may store any number of record chains and is not limited to a single record chain. The record chain shown in FIG. 1 indicates the state of a given data record after operations for various different transactions are performed on the given record stored in secondary node 140. As one specific example, data record 152A may indicate the state of data after a first write operation is performed on the given record, while data record 152B may be indicate the state of data after a second write operation is performed on the given record.

In disclosed embodiments, during the redo replay of transactions on the secondary node 140, records for three transactions 152A, 152B, and 152C are stored in in-memory cache 150B out of order. (Note that in-memory cache 150B is shown as storing N number of records, where N may be any number that is four or greater.) In the example shown in FIG. 1, records for transactions are stored in the following order 152B, 152A, and 152C (with 152C being on the top of a chain of records in the in-memory cache). In this example, when the visible XCN is advanced to an XCN value of 3, a query that includes a snapshot XCN of 2 would begin searching at data record 152C (since searches performed on both ordered and unordered record chains proceed at the top of the record chain downward), and would proceed to data record 152A, and then finally to 152B, which has an XCN of 2. The query would return data record 152B, since its XCN has the largest value less than or equal to 2 in the record chain. If, however, the records were stored in order (i.e., stored as 152A, 152B, and 152C, with 152C being the top of the record chain), then a query with a snapshot XCN of 2 will see record 152C, reject it since it has an XCN of 3 which is greater than 2 and then return record 152B (since it is next in the record chain). The search would end at record 152B since the record chain is in order (i.e., ordered as 152A (XCN of 1), 152B (XCN of 2), and 152C (XCN of 3)) and no record on the chain below 152B may have an XCN greater than 2.

In various embodiments, two different transactions are executed in temporal order, but data records corresponding to these two transactions are not completely ordered by the time the "committed" declaration is made. For example, there is a visible XCN for the record chain storing data records for the two transactions that indicates that records with an XCN at or before the visible XCN can be accessed by a query. Traditionally, a secondary node would wait until reordering of records was complete before increasing the visible XCN; however, disclosed techniques increase the visible XCN before reordering begins or is complete. As such, the next XCN commit can occur. As one specific example, a transaction T2 inserts records and is waiting to commit, but transaction T1 is still inserting records. Once T1 enters the commit phase, the database system is able to declare that T1 committed even before its records have been reordered within the in-memory cache of a database node. Since T1 "committed," T2 can start committing. In this example, a record being altered by T1 and a record being altered by T2 are different versions of the same record in the database. As such, these two records are stored in the same hash bucket within an in-memory cache of a database node, because they have the same hash value (same key value). Said another way, the two different transactions, T1 and T2 are making changes to the same record.

Turning now to FIG. 2, a block diagram is shown depicting example record chains with records that are out of order and visible according to a visible XCN. The diagram shown in FIG. 2 illustrates an example of how data records can become out of order within a record chain within in-memory cache 150B. In the illustrated embodiment, the top portion of the figure shows an example 250 situation in which data records within a record chain are reordered prior to being queried, while the bottom portion of the figure shows an example 260 situation in which data records are reordered prior to being available for querying. In both example situations, several different stages 210A, 210B, 210C, 210D and 220A, 220B, and 220C, respectively, are shown for the two different records chains.

In the illustrated embodiment, example 250 illustrates the behavior of record chain reordering prior to the use of the disclosed techniques. For example, in record chain 210A, transaction 204 inserts record 212 into Memstore and commits it with XCN 1001. However, the record 212 is not yet visible since transaction 208 has not yet been committed. In record chain 210B, transaction 208 inserts record 214 into Memstore and commits it with XCN 1000, but neither record (212 or 214) is yet visible since transaction 208 has not finished post-commit work (which includes reordering of record chains). In record chain 210C, transaction 208 finishes its post-commit work and now records 212 and 214 are properly reordered such that the visible XCN may be advanced to transaction 208's XCN (i.e., XCN 1000). Record 214 is visible, but record 212 is not. In record chain 210D, transaction 204 has observed that transaction 208 has completed post-commit processing for XCN 1000. The visible XCN is advanced to include transaction 204's XCN (i.e., XCN 1001). Both records 212 and 214 are now visible. Example 250 illustrates that record 212 is not visible until all processing associated with transaction 208 is complete. This delay between 208 committing and finishing its processing is the source of increased query latency and promotion time on standby database nodes.

The disclosed techniques solve the problem illustrated in example scenario 250 by advancing a visible XCN as soon as replay of a commit log record without waiting for sorting of out of order records stored in the hash bucket of in-memory cache 150B. The example 260 shows that multiple redo appliers are allowed to continue (i.e., transaction 204 with XID 2 is allowed to continue before the records from transaction 208 have been reordered). As such, records are visible to queries sooner than before, even while these records are out of order within their respective buckets. Example 260 illustrates the behavior of the disclosed system after applying the disclosed reordering techniques. For example, in record chain 220A, transaction 204 inserts record 212 into Memstore and commits this record with XCN 1001. However, the record is not yet visible since transaction 2008 has not been committed. In record chain 220B, transaction 208 inserts record 214 into Memstore and commits it with XCN 1000. Records 212 and 214 have been flagged as requiring recording (as discussed in further detail below with reference to FIG. 4), so the visible XCN may immediately be advanced to XCN 1001, and records 212 and 214 are both visible. In record chain 220C, records 212 and 213 have been sorted into descending XCN order, either as a side-effect of inserting record 214 in 220B or by subsequent query or purge operations on the hash bucket. Their reordered flags have been cleared. Example 260 illustrates that record 212 becomes visible at the earliest possible point (e.g., when its immediately preceding transaction, transaction 208 with XCN 1000 has committed).

Although only one record chain with records from two transactions is shown in each of examples 250 and 260, in other embodiments, any suitable number of record chains and records may be employed.

Example Query Type Determination

When a database server, such as, e.g., database store 160 receives a request to access a database, the database server may perform a series of operations in order to find the desired record, or to find a location in which to insert a new record in secondary node 140. An embodiment of methods for processing such requests are depicted in the flow diagram of FIG. 3. In the illustrated embodiment, two different retrieval processes are shown (one to be performed after records have been reordered and one to be performed before records are reordered within a given record chain within the secondary node). For example, prior to reordering, a record chain needs to be searched entirely, while after a record chain is reordered, it only needs to be searched until a record corresponding to a snapshot XCN (a search XCN) is discovered. For example, after a record chain has been reordered, a query may search the record chain until a record with an XCN at or less than a search XCN is located.

When a database transaction (e.g., a read operation) is initiated, it is assigned a snapshot XCN that identifies which records the transaction can access. If the commit XCN of a record is less than or equal to the snapshot XCN, then the transaction can access that record. Generally, when a transaction makes a request involving accessing records, the transaction is attempting to access a most recent version of the record that is equal to or less than its snapshot XCN, although transactions may request older versions of records.

Figure 3:
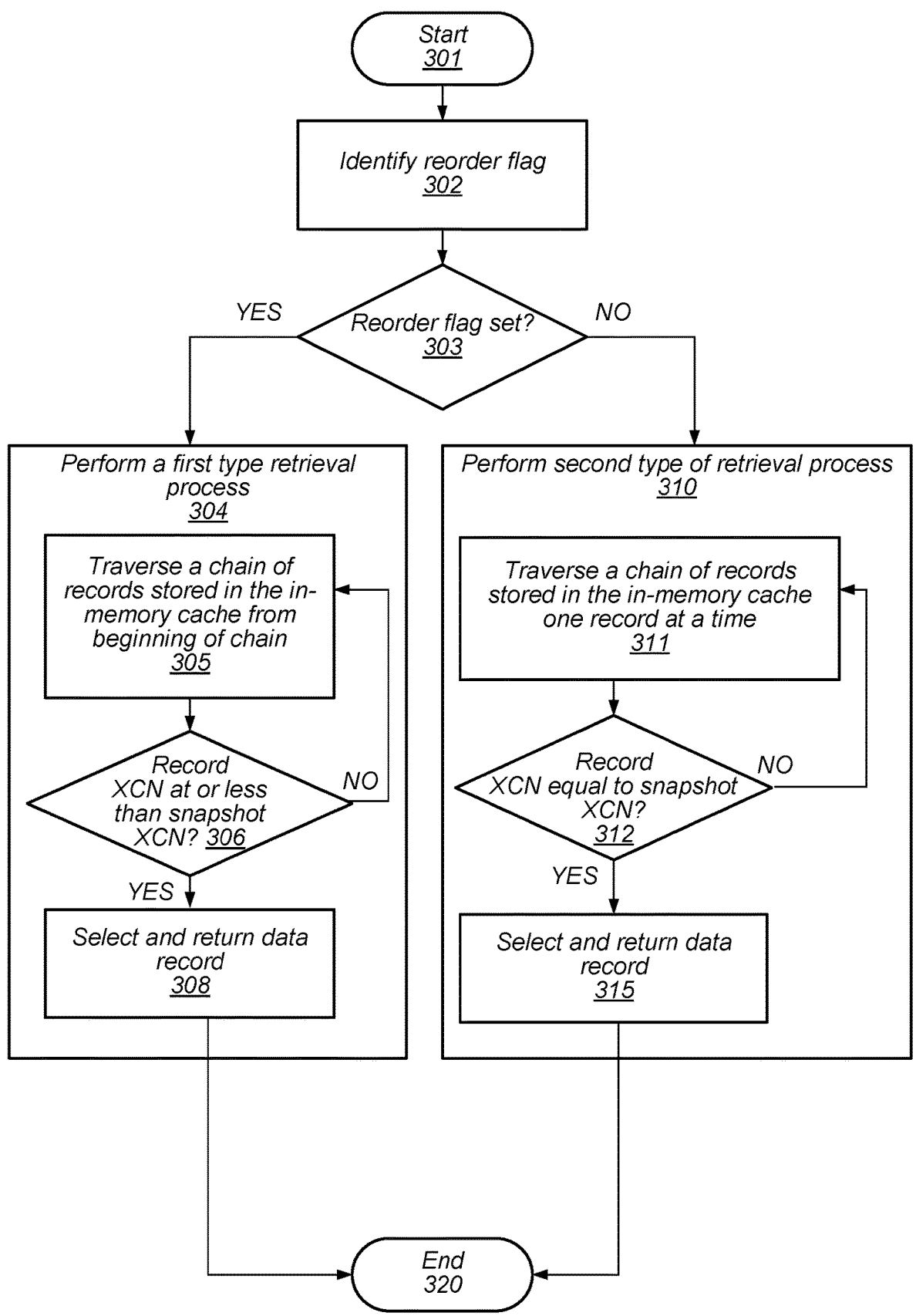
FIG. 3 is a flow diagram illustrating example query operations performed according to reorder flags, according to some embodiments.

A start element 301 is shown at the top of FIG. 3 leading to element 302 where a database server (e.g., secondary node 140) identifies a reorder flag. If the reorder flag is set, then the flow proceeds to element 304 where a first type of retrieval process is performed to retrieve records from the secondary node 140. If the reorder flag is not set (indicating that the records are stored out of temporal order within the in-memory cache 150B of secondary node 140), then the flow proceeds to element 310 where a second type of retrieval process is performed.

At element 304, in the illustrated embodiment, a first type of query is performed. At element 305, the database system traverses a chain of records stored in an in-memory cache from the beginning of the chain. At 306, if the record's XCN is at or less than the snapshot XCN of the transaction performing the first type of query, then the flow proceeds to element 308 where the record is selected and returned and the flow ends at 320. At 306, if the record's XCN is greater than the snapshot XCN, then the flow returns to element 305.

At element 310, in the illustrated embodiment, a second type of query is performed. At element 311, the database system traverses a chain of records stored in the in-memory cache one record at a time. At element 312, if the current record being searched has an XCN equal to the snapshot XCN, then the flow proceeds to element 315 where the record is selected and returned and the flow ends at 320. At element 312, if, however, the current recording being searched has an XCN that is not equal to the snapshot XCN, the flow returns to element 311 where the database system proceeds to searching the next data record stored in the unsorted record chain.

As one specific example utilizing the method illustrated in FIG. 3, a sorted record chain may include the following records: (beginning of chain) XCN 1002, XCN 1001, XCN 1000, XCN 999 (end of chain). In this example, the unsorted version of the record chain is: (beginning of chain) XCN 999, XCN 1001, XCN 1000, XCN 1002 (end of chain). In this example, a transaction with a read operation has a snapshot XCN of 1003 and the transaction is searching for the latest record version for a given key. If the chain being accessed is the sorted record chain, then the system will look at the first record (as the chain is accessed in order), see that it is XCN 1002 which is less than the snapshot XCN of 1003, and return that record. The database system does not have to look at the rest of the records in the chain because XCN 1002 is guaranteed to be the highest XCN because this chain is sorted. If, however, the chain being accessed is unsorted (the second chain discussed above), then the system will have to look at all records of the chain. If the system looks at only the first record (or even only the first three records), then it will miss the record with the highest XCN (the last record with 1002) of the unsorted chain. As such, the disclosed techniques utilize flags attached to individual records within a record chain to assist the database system in executing reads. Flags assigned to a record chain indicate which chains need to be fully searched (e.g., which chains are unsorted) and which chains only need to be searched until a record is found that is equal to or less than the search XCN (which is generally the snapshot XCN). As one specific example, if a flag is "set," this flag may have a binary value of 1, while an unset flag may have a value of 0. In some embodiments, a global flag is set for a secondary node. In other embodiments, per record flags are set to indicate whether records stored in respective hash buckets are currently out of order.

Example Purge Operations

Figure 4:
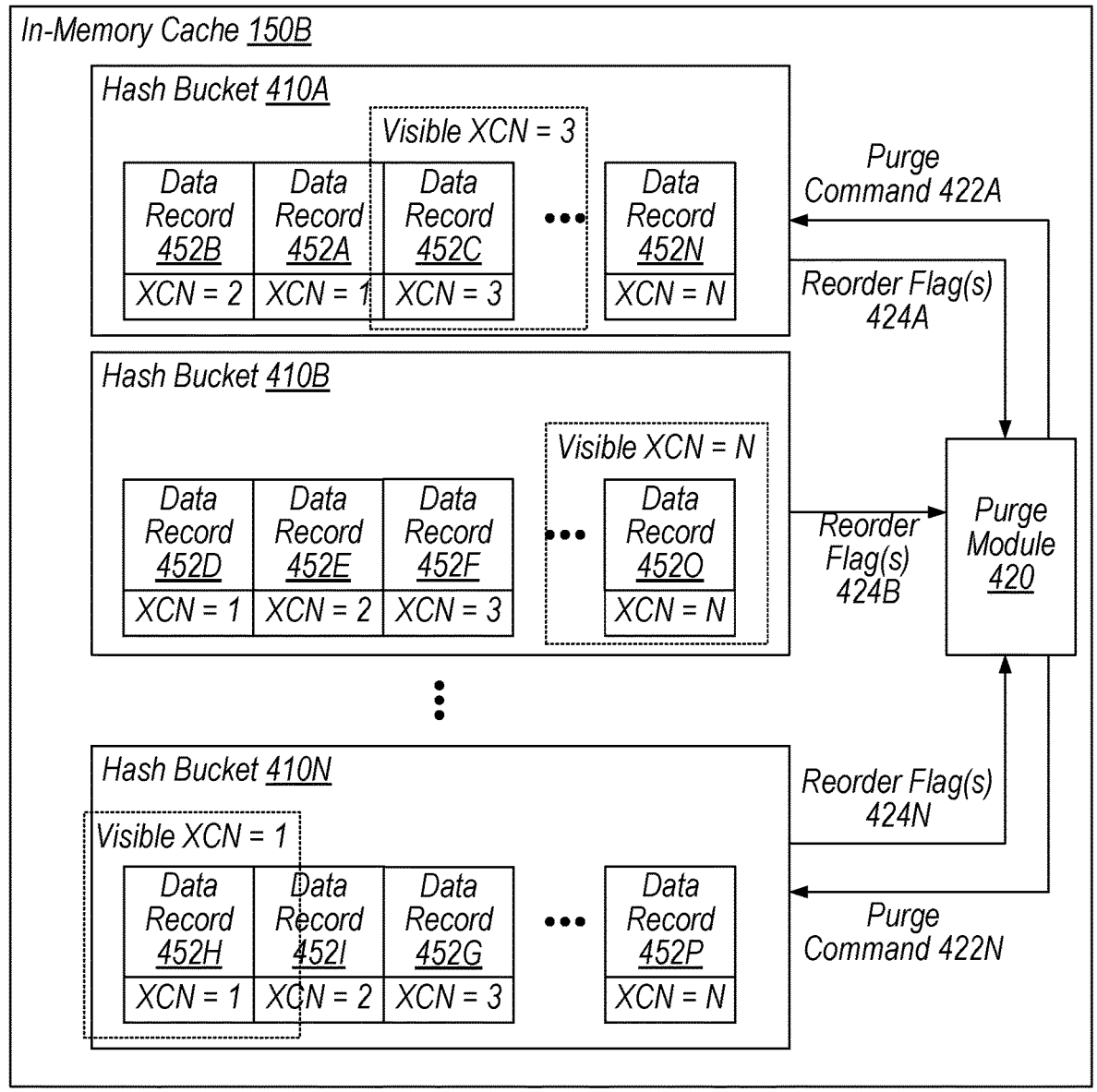
FIG. 4 is a block diagram depicting an example purge module, according to some embodiments.

FIG. 4 is a block diagram depicting an example purge module. In the illustrated embodiment, secondary node 140 executes a purge module 420 within in-memory cache 150B to reorder data records within respective hash buckets 410A-410N. In various embodiments, sorting of records stored in hash buckets may occur in the background by redo appliers.

Hash buckets store data records based on the primary key of a given data record. For example, data records from several different transactions may be stored in the same hash bucket based on the hash value of a primary key of data records included in the different transactions being the same. That is, a first transaction may write data to a given location in the database, resulting in data record version 452A while a second transaction (executed after the first transaction) may write data to the same location in the database, resulting in data record version 452B. Since the primary key corresponding to the given location in the database is the same, these data records will both have the same hashed value of their primary key, causing secondary node 140 to store both of the data records 452A and 452B from the two different transactions in the same hash bucket 410A.

Purge module 420, in the illustrated embodiment, reads reorder flag(s) 424A from hash bucket 410A, indicating that one or more data records within bucket 410A need to be reordered according to their XCNs (record chains containing out-of-order XCNs will be assigned reorder flags which are picked up by the purge logic of module 420). For example, data record 452B corresponds to a transaction that committed after a transaction corresponding to data record 452A. Within hash bucket 410A, however, the data record with XID 452B was stored prior to the data record 452A. Thus, the data records within hash bucket 410A need to be reordered. For example, the data records included in hash bucket 410A have the following data records: 452B, 452A, 452C, and 452N. As shown in the illustrated embodiment, at least data records 452B, 452A, and 452C are out of order. Accordingly, one or more records in this hash bucket 410A have been assigned reorder flag(s) 424A indicating that these records within this bucket need to be reordered. Based on receiving the flag(s), purge module 420 sends purge command 422A with reordering to hash bucket 410A in the illustrated embodiment. After purge command 422A with reordering is executed (and the data records in bucket 410A are reordered), purge module 420 may update the reorder flag(s) 424A assigned to records in bucket 410A indicating that they are now in proper order and do not require further reordering.

Purge module 420 retrieves reorder flag(s) 424B from hash bucket 410B and identifies, based on flag(s) 424B, that the data records stored in bucket 410B are currently in the proper order and do not require reordering. As such, purge module 420 does not send a purge command with reordering to bucket 410B and also does not update reorder flag(s) 424B. Purge module 420 also retrieves reorder flag(s) 424N and determines that one or more of data records 452H-452P need reordering. Purge module 420 transmits purge command 422N with reordering to hash bucket 410N.

Example Methods

FIG. 5 is a flow diagram depicting an example method for increasing the visibility of records via advancing a visible transaction commit number (XCN) within an in-memory cache prior to reordering data records stored in the cache, according to some embodiments. The method 500 shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 500 is performed by server system 100.

At 510, in the illustrated embodiment, a server system, retrieves, from a transaction log, log records detailing operations performed for a plurality of database transactions. In some embodiments, the server system is a standby database node, where the database recovery process is initiated in response to a primary database node failing.

At 520, in the illustrated embodiment, the server system inserts, based on the log records, data records of the plurality of database transactions into an in-memory cache of the server system. In some embodiments, the database recovery process includes promoting the standby database node to replace the primary database node. In some embodiments, the retrieving includes reading, by a reader process, one or more log records from the transaction log. In some embodiments, the retrieving includes adding, by the reader process, the one or more log records to one or more redo queues. In some embodiments, the inserting includes reading, by at least two applier processes in parallel, log records from the one or more redo queues. In some embodiments, the inserting includes executing, by the at least two applier processes in parallel, the operations specified in the one or more log records, where the executing includes the two applier processes executing respective transactions of the at least two data records that are assigned to the two applier processes. In some embodiments, the execution includes writing the at least two data records to the database in parallel. In some embodiments, the execution includes writing the at least two data records to the database within a threshold amount of time. The threshold may be set to any of various amounts of time, including but not limited to milliseconds, seconds, minutes, hours, days, etc. In order to complete execution of a write operation within the threshold amount of time refers to completing writing new or existing data to a database before the threshold amount of time has passed.

At 530, in the illustrated embodiment, the server system increases, prior to reordering data records inserted in the in-memory cache according to transaction commit numbers (XCNs) of the plurality of database transactions, a visible XCN, where data records corresponding to transactions with XCNs before the visible XCN are accessible via query. In some embodiments, at least two data records for a particular key with XCNs before the visible XCN are accessible out of a temporal order defined by XCNs of respective transactions corresponding to the at least two data records. In some embodiments, increasing the visible XCN prior to reordering records inserted in the same hash bucket in the in-memory cache decreases a time to complete the database recovery process relative to database recovery processes that increase the visible XCN before reordering records stored in a hash bucket.

In some embodiments, the server system determines, based on whether a reorder indicator assigned to the in-memory cache has been set to a specified state, a type of retrieval process to perform to retrieve one or more data records from the in-memory cache. In some embodiments, in response to determining to perform a second type of retrieval process, the server system retrieves, from the in-memory cache during the database recovery process, one or more data records, where retrieving the one or more data records includes searching a chain of records stored in the in-memory cache until a data record for a particular key is discovered. In some embodiments, the data record for the particular key corresponds to a transaction with an XCN at or less than a search XCN. For example, the server system may perform a search in the Memstore of a secondary node after the records within the node have been reordered (e.g., a purge process has been complete).

In some embodiments, in response to determining, based on a reorder indicator (e.g., a reorder flag) being unset, to perform a first type of retrieval process, the server system retrieves, from the in-memory cache during the database recovery process, one or more data records, where retrieving the one or more data records includes searching an entire chain of records within the in-memory cache storing the at least two data records for the particular key.

In some embodiments, the server system executes, during the database recovery process, at least one purge process. In some embodiments, the purge process includes determining, based on a reorder indicator assigned to records in a given hash bucket, whether to reorder records included in a record chain of committed transactions within the given hash bucket in the in-memory cache. In some embodiments, the purge process includes reordering, in response to the determining, one or more records within the record chain and changing, based on the indicated state of the records in the given hash bucket.

In some embodiments, during the database recovery process, the server system executes at least one purge process, including reordering, based on a global reorder indicator assigned the in-memory cache, one or more records stored in one or more hash buckets of the in-memory cache and updating the global reorder indicator based on the reordering. In some embodiments, the in-memory cache includes a hash table having hash buckets, where the in-memory cache executes transactional updates concurrently for the database by storing data records for one or more transactional updates as key-value pairs within one or more skip lists within hash buckets based on hash values of respective keys of the data records. In some embodiments, the transaction log is a shared storage shared by a primary database node and one or more standby database nodes.

FIG. 6 is a flow diagram depicting an example method for reducing a responsiveness time for a second computing node state of a database in switching from a secondary node to replace a first computing node of the database that has been acting in a primary node state of the database, with the second computing node performing the same database queries to execute the same transactions by the database while in a secondary node state as those database transactions being processed by the first computing node in the primary state, the second computing node being operatively coupled to receive information regarding queries to be performed on the database by the first computing node while in the primary node state, according to some embodiments. The method 600 shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 600 is performed by server system 100.

At 610, in the illustrated embodiment, a second computing node retrieves, from a transaction log, log records detailing operations performed for a plurality of database transactions. In some embodiments, the second computing node responds to one or more read requests received for the database. In some embodiments, the second computing node rejects one or more write requests received for the database. In some embodiments, the retrieving includes reading, by a reader process, one or more log records from the transaction log. In some embodiments, the retrieving includes adding, by the reader process, the one or more log records to one or more redo queues.

In some embodiments, the inserting includes reading, by at least two applier processes in parallel, log records from the one or more redo queues. In some embodiments, the inserting includes executing, by the at least two applier processes in parallel, the operations specified in the one or more log records, where the executing includes the two applier processes executing respective transactions of at least two data records that are assigned to the two applier processes, and where the execution includes writing the at least two data records to the database in parallel.

At 620, in the illustrated embodiment, the second computing node inserts, based on the log records, data records of the plurality of database transactions into an in-memory cache of the second computing node that stores chains of data records from different transactions. In some embodiments, the second computing node is a standby database node, where a database recovery process is initiated in response to a primary database node failing, and where the database recovery process includes promoting the standby database node to replace the primary database node. In some embodiments, the secondary node state of the standby database node is a log-tailing state. For example, the log-trailing state of the standby node causes the standby database node to copy operations performed on the primary database node such that the standby node matches the primary database node. In some embodiments, the database recovery process includes promoting the standby database node to replace the primary database node, including switching the standby node from the secondary node state to the primary node state.

At 630, in the illustrated embodiment, the second computing node, upon receiving sufficient information to switch to the primary node state, changing a mode of operation at least during failover to permit a committed transaction to be available for reads by a subsequent database query prior to record chain reordering. In some embodiments, the second computing node determines, based on whether a reorder indicator assigned to the in-memory cache has been set to a specified state, a type of retrieval process to perform to retrieve one or more data records from the in-memory cache.

In some embodiments, in response to determining, based on a reorder indicator being unset, to perform a first type of retrieval process, the second computing node retrieves from the in-memory cache during at least during failover, one or more data records, wherein retrieving the one or more data records includes searching, an entire chain of records within the in-memory cache storing at least two data records for a particular key with XCNs before a visible XCN that are accessible out of temporal order defined by XCNs of respective transaction corresponding to the at least two data records.

In some embodiments, the second computing node executes at least one purge process during failover. In some embodiments, the purge process includes determining, based on an indicated state of a given hash bucket, whether to reorder records included in a record chain of committed transactions within the given hash bucket in the in-memory cache. In some embodiments, the purge process includes reordering, in response to the determining, one or more records within the record chain. In some embodiments, the purge process includes changing, based on the reordering, the indicated state of the given hash bucket.

Example Computing Device

Figure 7:
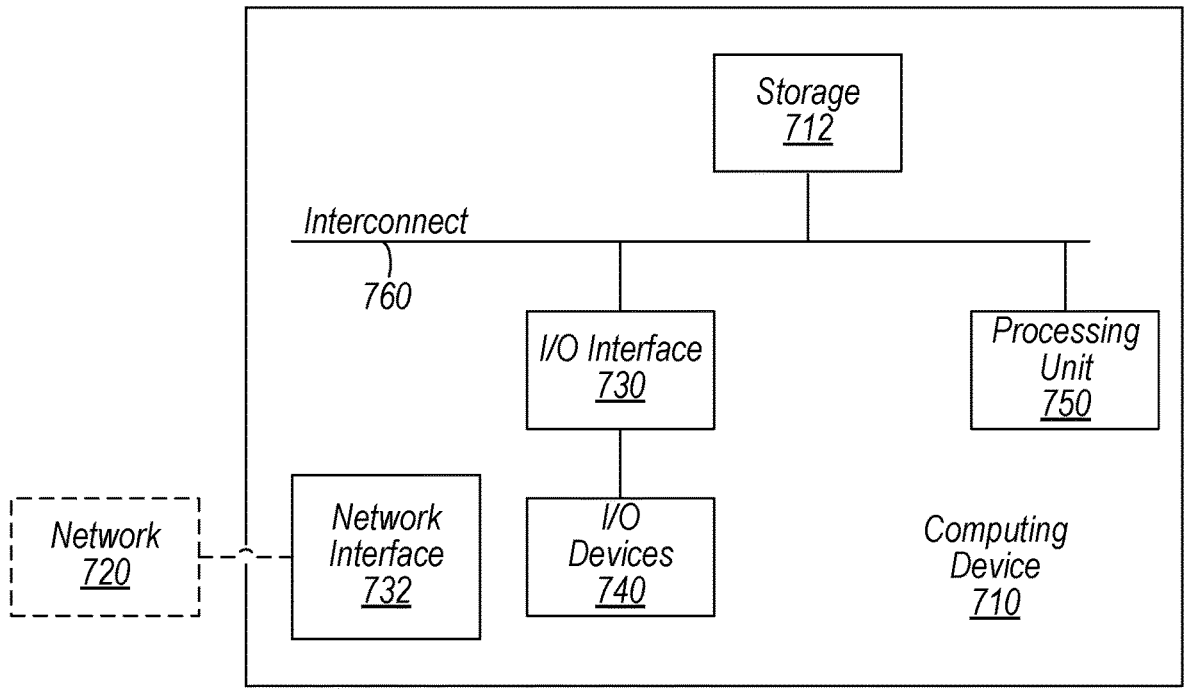
FIG. 7 is a block diagram illustrating a computing system, according to some embodiments.

Turning now to FIG. 7, a block diagram of a computing device (which may also be referred to as a computing system) 710 is depicted, according to some embodiments. Computing device 710 may be used to implement various portions of this disclosure. Computing device 710 is one example of a device that may be used as a mobile device, a server computing system, or any other computing system implementing portions of this disclosure. For example, computing device 710 may be a device that hosts the database store 160.

Computing device 710 may be any suitable type of device, including, but not limited to, a personal computer system, desktop computer, laptop or notebook computer, mobile phone, mainframe computer system, web server, workstation, or network computer. As shown, computing device 710 includes processing unit 750, storage subsystem 712, input/output (I/O) interface 730 coupled via interconnect 760 (e.g., a system bus). I/O interface 730 may be coupled to one or more I/O devices 740. Computing device 710 further includes network interface 732, which may be coupled to network 720 for communications with, for example, other computing devices. For example, the network 720 may be part of or all of the network 112 in FIG. 1.

The processing unit 750 may include one or more processors. In some embodiments, processing unit 750 includes one or more coprocessor units. In some embodiments, multiple instances of processing unit 750 may be coupled to interconnect 760. Processing unit 750 (or each processor within processing unit 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

It is noted that the embodiment depicted in FIG. 7 is merely an example. In other embodiments, different components and different arrangements of components in computing device 710 are possible and contemplated.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 712 may consist solely of volatile memory in some embodiments. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In some embodiments, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

\*\*\*

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

\*\*\*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for reducing a responsiveness time for a secondary node state of a database in switching from a second computing node to replace a first computing node of the database that has been acting in a primary node state of the database, with the second computing node performing the same database queries to execute the same transactions by the database while in the secondary node state as those database transactions being processed by the first computing node in the primary node state, the second computing node being operatively coupled to receive information regarding queries to be performed on the database by the first computing node while in the primary node state, the method comprising:
   retrieving, by the second computing node from a transaction log, log records detailing operations performed for a plurality of database transactions;
   inserting, by the second computing node based on the log records, data records of the plurality of database transactions into an in-memory cache of the second computing node that stores chains of data records from different transactions;
   upon receiving sufficient information to switch to the primary node state, changing, by the second computing node, a mode of operation at least during failover to permit a committed transaction to be available for reads by a subsequent database query prior to record chain reordering; and
   retrieving, by the second computing node from the in-memory cache and based on a reorder indicator assigned to the in-memory cache being set to a specified state, one or more data records.

2. The method of claim 1, further comprising:
   determining, by the second computing node based on whether the reorder indicator assigned to the in-memory cache has been set to the specified state, a type of retrieval process to perform to retrieve the one or more data records from the in-memory cache.

3. The method of claim 1, further comprising:
   responding, by the second computing node, to one or more read requests received for the database; and
   rejecting, by the second computing node, one or more write requests received for the database.

4. The method of claim 1, wherein the retrieving the one or more data records is further performed based on: determining, based on the reorder indicator being unset, to perform a first type of retrieval process, wherein retrieving the one or more data records includes searching, an entire chain of records within the in-memory cache storing at least two data records for a particular key with XCNs before a visible XCN that are accessible out of temporal order defined by XCNs of respective transactions corresponding to the at least two data records.

5. The method of claim 1, further comprising:
   executing, by the second computing node during failover, at least one purge process, including:
      determining, based on an indicated state of records in a given hash bucket, whether to reorder records included in a record chain of committed transactions within the given hash bucket in the in-memory cache;
      reordering, in response to the determining, one or more records within the record chain; and
      changing, based on the reordering, the indicated state of the given hash bucket.

6. The method of claim 1, wherein the second computing node is a standby database node, wherein the secondary node state of the standby database node is a log-tailing state, wherein a database recovery process is initiated in response to a primary database node failing, and wherein the database recovery process includes promoting the standby database node to replace the primary database node, including switching the standby node from the secondary node state to the primary node state.

7. The method of claim 1, wherein the retrieving includes:
   reading, by a reader process, one or more log records from the transaction log; and
   adding, by the reader process, the one or more log records to one or more redo queues.

8. The method of claim 7, wherein the inserting includes:
   reading, by at least two applier processes in parallel, log records from the one or more redo queues; and
   executing, by the at least two applier processes in parallel, the operations specified in the one or more log records, wherein the executing includes the two applier processes executing respective transactions of at least two data records that are assigned to the two applier processes, and wherein the execution includes writing the at least two data records to the database in parallel.

9. A non-transitory, computer-readable medium having instructions stored thereon that are capable of causing a server system to implement a database recovery operation comprising:
   retrieving, from a transaction log that is a shared storage shared by a primary database node and one or more standby database nodes, log records detailing operations performed for a plurality of database transactions;
   inserting, based on the log records, data records of the plurality of database transactions into an in-memory cache of the server system;
   increasing, prior to reordering records inserted in the in-memory cache according to transaction commit numbers (XCNs) of the plurality of database transactions, a visible XCN, wherein records corresponding to transactions with XCNs before the visible XCN are accessible via query, and wherein at least two data records for a particular key with XCNs before the visible XCN are accessible out of temporal order defined by XCNs of respective transactions corresponding to the at least two data records; and
   retrieving, from the in-memory cache during the database recovery operation and based on a reorder indicator assigned to the in-memory cache being set to a specified state, one or more data records.

10. The non-transitory, computer-readable medium of claim 9, wherein the operation further comprises:
    selecting, based on a reorder flag being unset, a first type of retrieval process; and
    retrieving, from the in-memory cache during the database recovery operation and according to the first type of retrieval process, the one or more data records, wherein retrieving the one or more data records includes searching an entire chain of records within the in-memory cache storing the at least two data records for the particular key.

11. The non-transitory, computer-readable medium of claim 9, wherein the operation further comprises:
   executing, during the database recovery operation, at least one purge process, including:
      determining, based on an indicated state of record in a given hash bucket, whether to reorder records included in a record chain of committed transactions within the given hash bucket in the in-memory cache;
      reordering, in response to the determining, one or more records within the record chain; and
      changing, based on the reordering, the indicated state of the records in the given hash bucket.

12. The non-transitory, computer-readable medium of claim 9, wherein the retrieving the one or more data records is further performed based on:
   determining, based on the reorder indicator, a type of retrieval process to perform to retrieve the one or more data records from the in-memory cache, wherein the retrieving is performed according to the type of retrieval process determined based on the reorder indicator, wherein retrieving the one or more data records includes searching a chain of records stored in the in-memory cache until a data record for a particular key is discovered, and wherein the data record for the particular key corresponds to a transaction with an XCN at or less than a search XCN.

13. The non-transitory, computer-readable medium of claim 9, wherein the operation further comprises:
   executing, during the database recovery operation, at least one purge process, wherein the executing includes:
      reordering, based on a global reorder flag assigned to the in-memory cache, one or more records stored in one or more hash buckets of the in-memory cache; and
      updating, based on the reordering, the global reorder flag.

14. The non-transitory, computer-readable medium of claim 9, wherein the in-memory cache includes a hash table having hash buckets, and wherein the in-memory cache executes transactional updates concurrently for a database by storing data records for one or more transactional updates as key-value pairs within one or more skip lists within hash buckets based on hash values of respective keys of the data records.

15. The non-transitory, computer-readable medium of claim 9, wherein increasing the visible XCN prior to reordering records inserted in the same hash bucket in the in-memory cache decreases a time to complete a database recovery process relative to database recovery processes that increase the visible XCN after reordering records stored in a hash bucket.

16. A system, comprising:
   at least one processor; and
   a memory having instructions stored thereon that are executable by the at least one processor to cause the system to perform a database recovery process, including:
      retrieving, from a transaction log, log records detailing operations performed for a plurality of database transactions;
      inserting, based on the log records, database records of the plurality of database transactions into an in-memory cache of the system;
      increasing, prior to reordering records inserted in the in-memory cache according to transaction commit numbers (XCNs) of the plurality of database transactions, a visible XCN, wherein records corresponding to transactions with XCNs before the visible XCN are accessible via query, and wherein at least two data records for a particular key with XCNs before the visible XCN are accessible out of temporal order defined by XCNs of respective transactions corresponding to the two data records; and
      retrieving, from the in-memory cache during the database recovery process and based on a reorder flag assigned to the in-memory cache being set to a specified state, one or more data records.

17. The system of claim 16, wherein in response to determining, based on the reorder flag being unset to perform a first type of retrieval process:
   retrieving, from the in-memory cache during the database recovery process, the one or more data records, wherein retrieving the one or more data records includes searching an entire chain of records within the in-memory cache storing the at least two data records for the particular key.

18. The system of claim 16, further comprising:
   executing, during the database recovery process, at least one purge process, including:
      determining, based on the reorder flag assigned to records in a given hash bucket, whether to reorder records included in a record chain of committed transactions within the given hash bucket in the in-memory cache;
      reordering, in response to the determining, one or more records within the record chain; and
      removing, based on the reordering, the reorder flag from records in the given hash bucket.

19. The system of claim 16, wherein the retrieving and inserting includes:
   reading, by a reader process, one or more log records from the transaction log;
   adding the one or more log records to one or more redo queues;
   reading, by at least two applier processes in parallel, log records from the one or more redo queues; and
   executing, by the at least two applier processes in parallel, the operations specified in the one or more log records, wherein the executing includes the two applier processes executing respective transactions of the at least two data records that are assigned to the two applier processes, wherein the execution includes writing the at least two data records to a database within a threshold amount of time.

20. The system of claim 16, wherein the transaction log is a shared storage shared by a primary database node and one or more standby database nodes.

* * * * *